United States Patent
Richardson (10) Patent No.: US 7,908,662 B2
(45) Date of Patent: Mar. 15, 2011

(54) SYSTEM AND METHOD FOR AUDITING SOFTWARE USAGE

(75) Inventor: Ric B. Richardson, Irvine, CA (US)

(73) Assignee: Uniloc U.S.A., Inc., Irvine, CA (US)

( * ) Notice: Subject to any disclaimer, the term of this patent is extended or adjusted under 35 U.S.C. 154(b) by 491 days.

(21) Appl. No.: 12/140,917

(22) Filed: Jun. 17, 2008

(65) Prior Publication Data

US 2008/0320607 A1 Dec. 25, 2008

Related U.S. Application Data

(60) Provisional application No. 60/945,359, filed on Jun. 21, 2007.

(51) Int. Cl.
 *H04L 9/32* (2006.01)
(52) U.S. Cl. ............................... 726/26; 726/27; 726/31
(58) Field of Classification Search .......... 380/200–203; 726/26–33; 713/165–167, 176, 187; 705/56–59
 See application file for complete search history.

(56) References Cited

U.S. PATENT DOCUMENTS

| | | | |
|---|---|---|---|
| 4,351,982 A | 9/1982 | Miller et al. | |
| 4,658,093 A | 4/1987 | Hellman | |
| 4,704,610 A | 11/1987 | Smith et al. | |
| 4,796,220 A | 1/1989 | Wolfe | |
| 5,210,795 A | 5/1993 | Lipner et al. | |
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,509,070 A * | 4/1996 | Schull | 705/54 |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,925,127 A | 7/1999 | Ahmad | |
| 5,974,150 A | 10/1999 | Kaish et al. | |
| 6,009,401 A | 12/1999 | Horstmann | |
| 6,044,471 A | 3/2000 | Colvin | |

(Continued)

FOREIGN PATENT DOCUMENTS

AU 678985 6/1997

(Continued)

OTHER PUBLICATIONS

International Search Report and Written Opinion for corresponding International Application No. PCT/US2008/067400 dated Oct. 21, 2008, total 14 pages.

(Continued)

*Primary Examiner* — Hosuk Song
(74) *Attorney, Agent, or Firm* — Sean D. Burdick (57) ABSTRACT

Systems and methods are provided for auditing and selectively restricting software usage based on, for example, software copy counts or execution counts. In one embodiment, the method comprises verifying whether the serial number for a software installed on a computing device corresponds to one of recognized serial numbers, and calculating a copy count (or software execution count) for the serial number. In response to the copy count exceeding a defined upper limit, a limited unlock key may be sent to the device. The limited unlock key may allow the software to be executed on the device for a defined time period, a defined number of executions, and/or with at least one feature of the software disabled.

30 Claims, 2 Drawing Sheets

U.S. PATENT DOCUMENTS

| | | | |
|---|---|---|---|
| 6,134,659 A * | 10/2000 | Sprong et al. | 713/190 |
| 6,158,005 A | 12/2000 | Bharathan et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,670 B1 | 12/2001 | England et al. | |
| 6,449,645 B1 | 9/2002 | Nash | |
| 6,536,005 B1 | 3/2003 | Augarten | |
| 6,785,825 B2 | 8/2004 | Colvin | |
| 6,859,793 B1 | 2/2005 | Lambiase | |
| 6,920,567 B1 | 7/2005 | Doherty et al. | |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cognigni et al. | |
| 7,085,741 B2 | 8/2006 | Lao et al. | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,272,728 B2 | 9/2007 | Pierson et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,463,945 B2 | 12/2008 | Kiesel et al. | |
| 7,653,899 B1 | 1/2010 | Lindahl et al. | |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0161718 A1 | 10/2002 | Coley et al. | |
| 2003/0065918 A1 | 4/2003 | Willey | |
| 2003/0172035 A1 | 9/2003 | Cronce et al. | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0143746 A1 | 7/2004 | Ligeti et al. | |
| 2004/0187018 A1 | 9/2004 | Owen et al. | |
| 2005/0108173 A1 | 5/2005 | Stefik et al. | |
| 2005/0138155 A1 | 6/2005 | Lewis | |
| 2005/0172280 A1 | 8/2005 | Ziegler et al. | |
| 2006/0072444 A1 | 4/2006 | Engel et al. | |
| 2006/0095454 A1 | 5/2006 | Shankar et al. | |
| 2006/0161914 A1 | 7/2006 | Morrison et al. | |
| 2006/0265337 A1 | 11/2006 | Wesinger, Jr. | |
| 2006/0282511 A1 | 12/2006 | Takano et al. | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0282615 A1 | 12/2007 | Hamilton et al. | |
| 2008/0065552 A1 | 3/2008 | Elazar et al. | |
| 2008/0086423 A1 | 4/2008 | Waites | |
| 2008/0147556 A1 | 6/2008 | Smith et al. | |
| 2008/0228578 A1 | 9/2008 | Mashinsky | |
| 2008/0320607 A1 | 12/2008 | Richardson | |
| 2009/0083730 A1 | 3/2009 | Richardson | |
| 2009/0138975 A1 | 5/2009 | Richardson | |

FOREIGN PATENT DOCUMENTS

| | | |
|---|---|---|
| EP | 1 637 958 | 3/2006 |
| EP | 1 637 961 | 3/2006 |
| EP | 1 670 188 A2 | 6/2006 |
| WO | 92/20022 | 11/1992 |
| WO | 9301550 | 1/1993 |
| WO | 95/35533 | 12/1995 |
| WO | 0067095 | 11/2000 |
| WO | 2005/104686 A2 | 11/2005 |
| WO | 2007/060516 A2 | 5/2007 |
| WO | WO 2008/157639 | 12/2008 |
| WO | WO 2009/039504 | 3/2009 |
| WO | WO 2009/065135 | 5/2009 |
| WO | WO 2009/076232 | 6/2009 |
| WO | WO 2009/105702 | 8/2009 |
| WO | WO 2009/143115 | 11/2009 |
| WO | WO 2009/158525 | 12/2009 |
| WO | WO 2010/093683 | 8/2010 |

OTHER PUBLICATIONS

Angha et al.; Securing Transportation Network Infrastructure with Patented Technology of Device Locking—Developed by Uniloc USA; http://www.dksassociates.com/admin/paperfile/ITS%20World%20Paper%20/Submission_Uniloc%20_2_.pdf; Oct. 24, 2006.

Econolite; Econolite and Uniloc Partner to Bring Unmatched Infrastructure Security to Advanced Traffic Control Networks with Launch of StrongPoint; http://www.econolite.com/docs/press/20080304_Econolite_StrongPoint.pdf; Mar. 4, 2008.

Williams, "A Painless Guide to CRC Error Detection Algorithms," Aug. 13, 1993, 33 pages, www.ross.net/crc/download/crc_v3.txt.

International Search Report and Written Opinion mailed Aug. 3, 2009, for PCT Application No. PCT/US2009/034765.

Partial International Search Report mailed on Jun. 5, 2009 for PCT Application No. PCT/US2009/034765.

EP Office Action issued for Application No. 08 771 408.5 dated May 11, 2010.

* cited by examiner

SYSTEM AND METHOD FOR AUDITING SOFTWARE USAGE

CROSS-REFERENCE TO RELATED APPLICATION(S)

This application claims priority pursuant to 35 U.S.C. §119(e) to U.S. Provisional Application No. 60/945,359, filed Jun. 21, 2007, which application is specifically incorporated herein, in its entirety, by reference.

BACKGROUND OF THE INVENTION

1. Field of the Invention

The present invention is directed toward systems for auditing and restricting software usage, and related methods.

2. Description of the Related Art

Many systems for the protection of software products against piracy and abuse of copyright exist today. Popular approaches described in U.S. Pat. No. 5,490,216 and U.S. Pat. No. 6,243,468 link the license of the user of the software to a specific hardware platform by devising a unique identifier from the measurable characteristics, settings and identifiers already present within the computing hardware and its attached peripherals. With the above described method, the protected software communicates with an authorization authority, usually an Internet based online server, controlled by the software publisher. This communication is needed to ensure that the licensed party does not exceed the usage rights of the license that has been granted by the publisher.

The systems used in the art keep a record of how many devices have been authorized to run against each license, and when a certain predefined limit has been exceeded, the authorization server denies the software users request to run additional copies of the software on additional devices. For example, a publisher might allow five copies to be made and used of their copyrighted software for each user license sold. The first five requests made to the authorization authority may be allowed however the sixth and subsequent requests would be denied. Possibly the licensee would be encouraged to acquire an additional license.

This system has drawn criticism from software buyers since many users expect to be able to use software they have purchased on as many devices as they want as long as they own and use the devices. Additionally software buyers are changing, upgrading and replacing their computing devices on a more regular basis as people use computers more and more. This in turn requires additional flexibility on the part of the authorization authority to compensate for reasonable fluctuations in the usage circumstances of users protected under laws such as the Fair Use Act.

Software buyers may be dissatisfied with current authorization systems due to their inability to determine the difference between legitimate users, that may reasonably require a large number of copies of software for use on their own computing devices, and illegal copies made by pirates and or others who willfully abuse license terms by making indiscriminate copies for other users such as sharing over peer to peer software distribution networks.

Accordingly, it would be desirable to provide the ability to monitor and measure the usage of their software and to allow/disallow the running of licensed software over the complete life and usage of the software product.

SUMMARY OF THE INVENTION

In accordance with one aspect of the embodiments described herein, there is provided a method for auditing software usage, comprising: (a) receiving a serial number for a software installed on a computing device and a device identifier for the device; (b) determining whether the received serial number corresponds to one of recognized serial numbers; (c) in response to determination that the received serial number corresponds to one of the recognized serial numbers, calculating a copy count (or software execution count) for the received serial number; (d) in response to the copy count not exceeding a first upper limit of software copies (or software executions), sending an unlimited unlock key to the device; and (e) in response to the copy count being greater than the first preset number but not exceeding a second upper limit, sending a first limited unlock key to the device.

In accordance with another aspect of the embodiments described herein, there is provided a method for auditing software usage, comprising: (a) sending a serial number for a software installed on a computing device and a device identifier for the device to an authorization authority, the authorization authority calculating a copy count for the serial number (or software execution count); (b) in response to the copy count not exceeding a first upper limit of software copies (or software executions), receiving from the authorization authority an unlimited unlock key for the software; and (c) in response to the copy count being greater than the first upper limit but not exceeding a second upper limit, receiving from the authorization authority a first limited unlock key for the software.

DETAILED DESCRIPTION

The present invention addresses the need for a system and method for auditing and selectively controlling/limiting software usage. In the exemplary embodiments described herein, there are presented systems and methods for that allow for the rental of software where software is allowed to run for a pre-specified period of time in return for the purchase of a time limited license. It is noted that publishers sometimes use a time limited free trial period in which it is hoped that the user will want to continue the use of the software after the expiry of the free use period thereby requiring a license purchase and subsequent connection to the authorization authority. It is further noted that limited time licenses are may be used rather than new installs of software to trigger a requirement for the protected software to communicate with the authorization authority.

Figure 1:
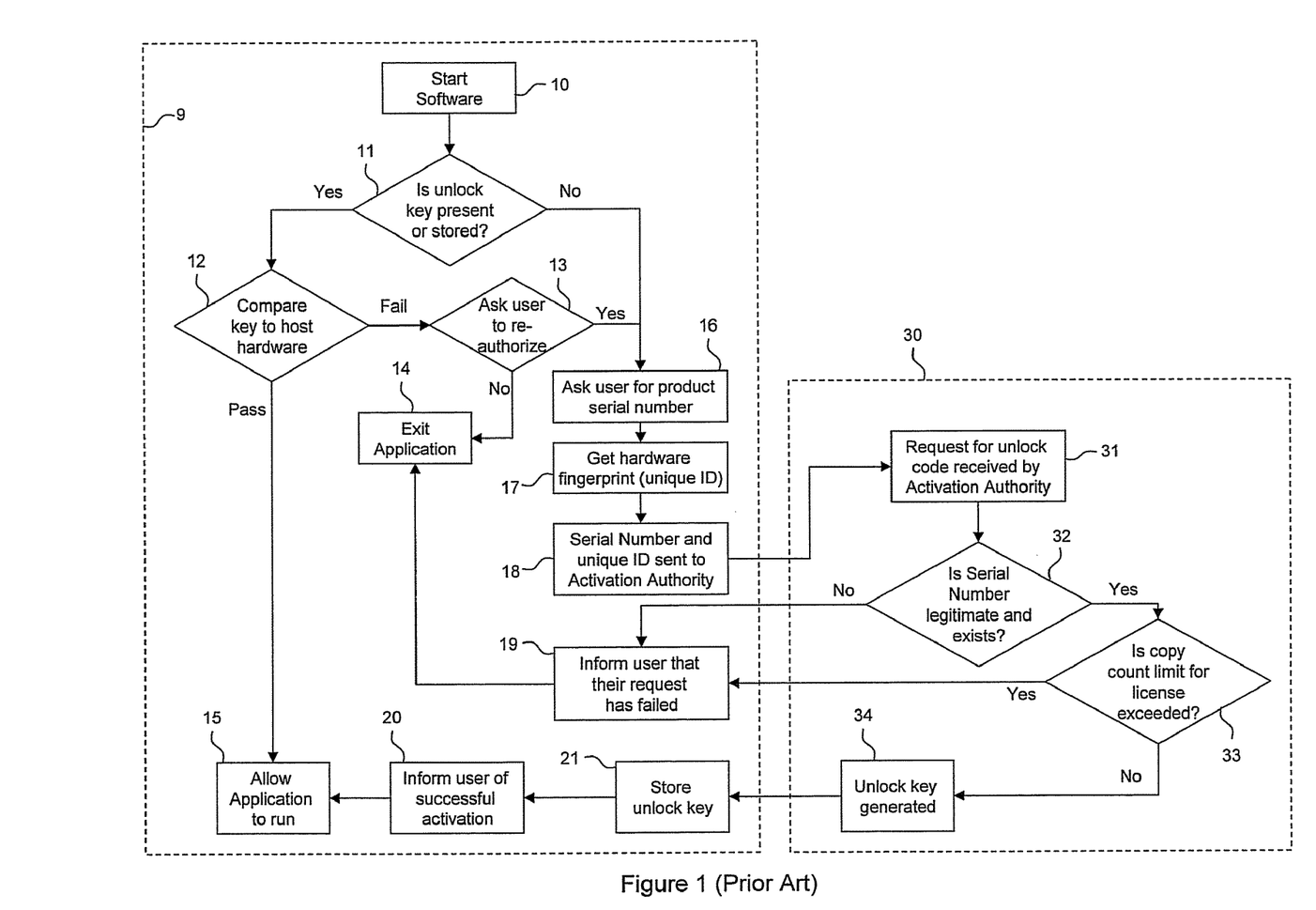
FIG. 1 illustrates a known authorization system (prior art).

FIG. 1 illustrates a system and method for software copy control that is believed to be known in the art. The system generally comprises client-side system (e.g., client 9) and an authorization system (e.g., authorization authority 30). The system of FIG. 1 implements a client-side process on client 9 and an authorization process on authorization authority 30. At step 10, the copy controlled software is executed on a computing device, often called a client 9 in the art. The protected software then checks to see if a license is granted for this software to run. A common way of doing this is to store an unlock key on the computing device which the software uses to verify the license. On this basis the software checks to see if the unlock key is present (step 11). If an unlock key is not present, an authorization process is started (step 16). If the unlock key is present then the key is compared to the unique hardware configuration of the computing device (step 12).

Information about the components, peripherals and settings of the computing device are compiled into a unique identifier that can be used to verify the identity of the device for purposes of identification.

If the hardware identity has not changed, the software is allowed to continue to run (step 15) such that the user can use the software. If the hardware identity is not the same or has changed then the user is asked for permission to re-authorize or re-activate the software (step 13). If the user chooses not to re-activate the software the protected program/software is terminated (step 14). If the user chooses to continue, the software starts the re-authorization process by asking the user to input the product's serial number (step 16). The serial number may be used to represent a license number that may be issued to the user as part of a software purchase transaction. Next, the unique device identifier is compiled from the computers unique hardware configuration (step 17). Then both the serial number and the unique device identifier are sent or communicated to the authorization authority 30 for license verification.

The authorization authority 30 checks to see if a valid license exists for the user that is requesting authorization, and if the user has not exceeded the limit set for the number of copies allowed under the license terms. The authorization authority 30 receives the serial number and the unique device identifier (step 31) and then checks to see if the serial number exists and represents a legitimate license (step 32). If the serial number does not exist in a database of the Authorization Authorities 30, then a message is communicated back to the client system 9 and displayed to the user (step 19) before the software is terminated 14. If the serial number does exist (step 32) then the count of previous successful authorizations is calculated and a decision/determination is made by the authorization authority as to whether or not the copy count limit has been exceeded for this particular serial number (step 33).

If the copy count for the serial number has been exceeded, as determined at step 33, then a message is sent to the client system and the user is informed that their request for authorization has failed (step 19). Subsequently the client software is terminated (step 14). If the copy count for the serial number has not been exceeded, as determined at step 33, then an unlock key is generated (step 34) for the specific serial number and unique device identifier, and communicated to the client system 9. Upon receipt of the unlock key by the client system 9 the unlock key is stored (step 21) for future reference by the license checking system and the user is informed that their request for authorization of their software was successful (step 20). The software is then allowed to run (step 15).

Figure 2:
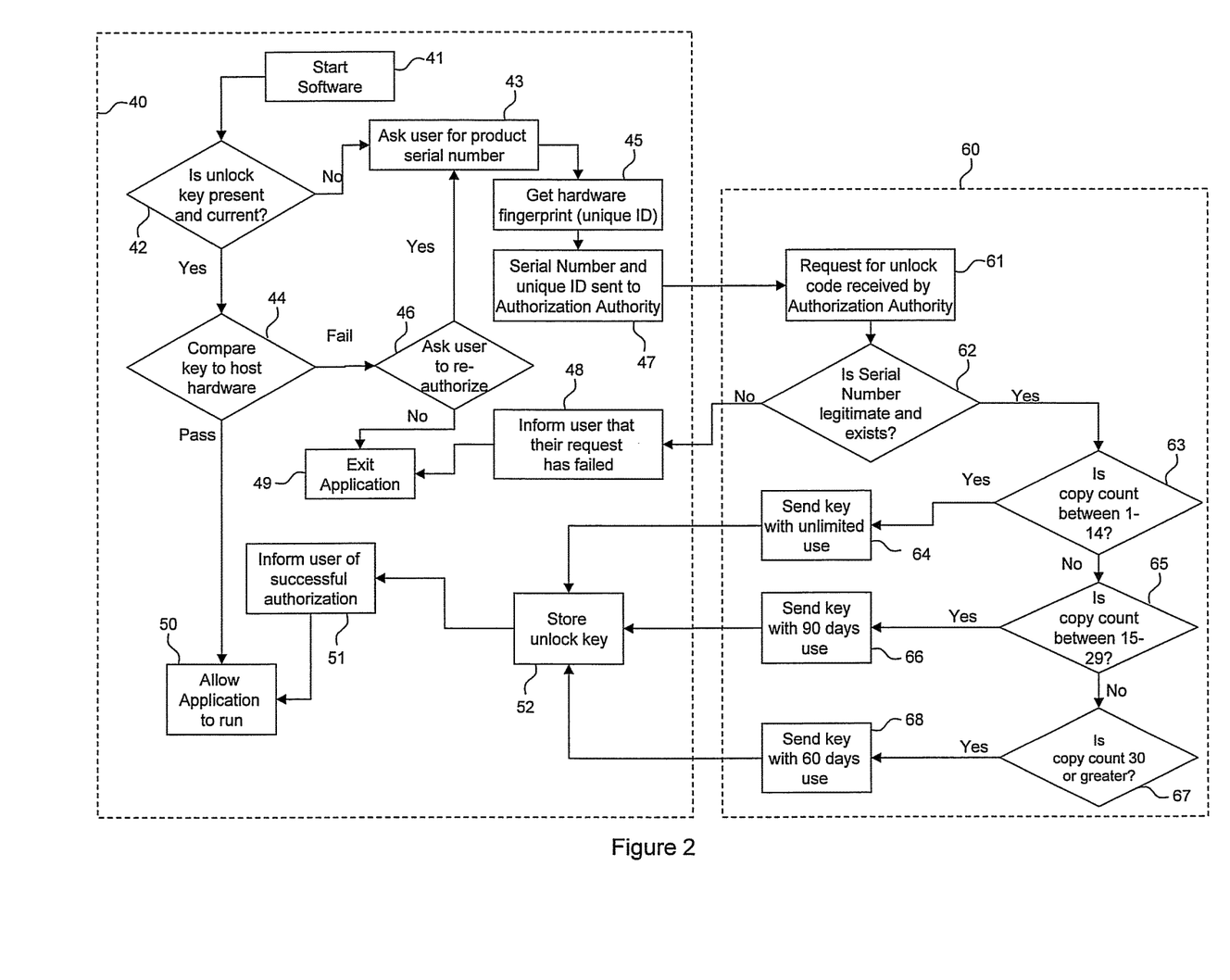
FIG. 2 illustrates an embodiment of an authorization system.

With reference to FIG. 2, there is shown an exemplary audit system that allows copy control after the initial authorization of the licensed software. The copy controlled software is executed (step 41) on a computing device, also referred to as the client 40. The auditing and copy control approaches described herein are applicable to computing devices in general, including but not limited to, desktops, laptops, tablet computers, PDAs, mobile devices, mobile phones, vehicle onboard computers, or any network device capable of communication with a computer network.

The protected software checks to see if a license is granted for this software to run. An exemplary way of doing this is to store an unlock key or code on the computing device which the software uses to verify the license. On this basis the software checks to see if the unlock key is present (step 42). If an unlock key is not present, an authorization process is started (step 43). If the unlock key is present, then the key is compared to the hardware configuration of the computing device (step 44). Information about the components, peripherals and settings of the computing device are compiled into a unique identifier that can be used to verify the identity of the device for purposes of identification.

The identification information or device identifier generally comprises information that is expected to be unique for the computing device. The device identifier is preferably generated from non-user-configurable machine parameters of the computing device, such as, for example, hard disk serial number, MAC ID, RAM manufacturing date, etc. It is noted that each data storage device of the computing device may gave a large variety of damage and unusable data sectors that are nearly unique to each physical unit. Accordingly, the process for generating a device identifier may include measuring physical, non-user-configurable characteristics of disk drives and solid state memory devices.

The machine parameters may relate to the platform on which a web browser or another application runs, such as, for example, CPU number, or unique parameters associated with the firmware in use. The machine parameters may also include system configuration information, such as amount of memory, type of processor, software or operating system serial number, etc. The device identifier generated from the machine parameters may include the computing device's IP address and/or other geo-location code to add another layer of specificity to the computing device's unique identifier. In the alternative, or in addition, the device identifier may comprise a randomly generated and assigned number that is unique for and stored on the computing device.

If the hardware identity has not changed, the software is allowed to continue to run (step 50) such that the user can use the software. If the hardware identity is not the same or has changed, then the user is asked for permission to re-authorize or re-activate the software (step 46). If the user chooses not to re-activate the software, the protected program is terminated (step 49). If the user chooses to continue, the software starts the re-authorization process by asking the user to input the product serial number (step 43). The serial number may represent a license number that is usually issued to the user as part of a software purchase transaction. Next, the unique device identifier is compiled from the hardware configuration of the computing device (step 45). Then both the serial number and the unique device identifier are sent or communicated (step 47) to the authorization authority or system 60 for license verification.

The authorization authority 60 checks to see if a valid license exists for the user that is requesting authorization, and if the user has not exceeded the limit set for the number of copies allowed under the license terms. The authorization authority 60 receives the serial number and the unique device identifier (step 61) and then checks to see if the serial number exists and represents a legitimate license (step 62). If the serial number does not exist in a database of the authorization authorities 60, as determined in step 62, then a message indicating such is communicated back to the client system 40 and displayed to the user (step 48) before the software is terminated (step 49).

If the serial number does exist, as determined at step 62, then the count of previous successful authorizations is calculated or otherwise determined. In the illustrated example, the first fourteen copies of the software made from or corresponding to a single serial number may be given an unlock code that allows the software to run in a non-restricted or unlimited manner (e.g., indefinitely without a time limit) (step 63). The unlock key may be communicated to the client system and stored (step 52) for future use and retrieval (e.g., step 42). The user may be informed of the successful authorization (step 51) and the software may be allowed to run (step 50).

If the count of copies for this specific serial number is fifteen or greater but less than thirty (step 65), then an unlock code is generated that allows the user to use the software for the next ninety days (step 66). In turn, this time-limited key may be stored (step 52), the user informed (step 51), and the application allowed to run (step 50). If the count of copies for this specific serial number is thirty or greater (step 67), then an unlock code may be generated that allows the user to use the software for the next sixty days (step 68). In turn, this time-limited key may be stored (step 52), the user informed (step 51), and the application allowed to run (step 50).

It is noted that the software may be executed on the computing platform and the license management system may check to see if a legitimate and current license to use the software is present. The license may include a serial number for the licensed software and a unique ID that may be representative of the hardware environment or fingerprint that the software is allowed to run on. The unique ID may be checked against the current hardware configuration and if there has been no change to the configuration of the hardware the software is allowed to run. If the unique ID does not compare correctly to the hardware environment, the user may be asked for permission to contact the authorization authority for authorization of the software to run. The software may attempt to communicate with an authorization authority to obtain a license to run the software on this particular computing device. Upon the successful communication with the authorization authority the user's serial numbers may be checked for validity and then compared to a database that stores a running count of the number of copies of the software currently issued against that particular serial number.

Under the license terms of the software a limited number of copies of the software may be allowed for any individual serial number. Traditionally, such as in the embodiment of FIG. 1, if the number of copies for any single serial number has not been exceeded, an unlock key may be generated and returned to the client system and stored for use in future executions of the software. In FIG. 1, if the number of allowed copies has been exceeded, the authorization authority may disallow any additional copies to be activated and a message, telling the user that their attempt to activate their software has failed due to exceeding the copy count of their software. Subsequently, the software may not be allowed to run and may be terminated.

In contrast to traditional systems, such as the system shown in FIG. 1, there is provided an audit/authorization system that is not limited to the allow/disallow paradigm, and that provides software auditors and/or licensors more ways to control how software may be used on computing devices. For example, FIG. 2 illustrates a representative approach to handling requests for additional copies of a given software to be run on additional computing devices. In one exemplary approach, sometimes referred to as audit mode, all requests for authorization of copies of software may be allowed. However, the system may keep a log of the count of copies requested for an individual software serial number and may activate each copy with, for example, an escalating series of restrictions.

The audit/authorization authority may deliver an unlock key allows the software to run indefinitely (e.g., step 64) without requiring re-authorization for up to a first set number or upper limit of copies of the software (e.g., step 63) for a given serial number. For example, the delivered unlock key may allow the software to run indefinitely for up to the first fourteen copies of software made for a specific serial number. Copies numbering greater than the first upper limit and not exceeding the second upper limit (wherein the second upper limit is higher than the first upper limit) may retrieve a limited use key that enables the software to run for a first defined time period (e.g., step 66) before requiring re-authorization to continue usage. For example, copies numbering from fifteen to twenty-nine may retrieve a limited use key that enables the software to run for ninety calendar days before requiring re-authorization to continue usage. Copy numbers greater than the second upper limit may retrieve a limited use key that enables the authorized software to run for a second defined time period (e.g., step 68) before requiring re-authorization to continue usage. For example, copy numbers thirty or greater may retrieve a limited use key that enables the authorized software to run for sixty calendar days before requiring re-authorization to continue usage. It is noted that the numbers used herein for the upper and lower limits and time periods are merely exemplary, and that other numbers may be used as appropriate for a given application.

The system of FIG. 2 allows software publishers of software products to initially monitor the copying practices of software buyers and software sharers, legal and illegal. Then with the use of the time-limited unlock codes they may optionally limit and/or police the number of copies that they will allow to be used for each individual serial number.

The publisher of the software may optionally change the authorization authority from audit mode 60 of FIG. 2 back to limiting mode 30 of FIG. 1 if the decision is to limit the number of copies made for an individual serial number, such as, for example, when it is clear that license terms are being abused, ignored or broken. Accordingly, in one embodiment, the audit/authorization system is adapted to switch between the auditing mode 60 and the limiting mode 30.

In the alternative, or in addition, the authorization authority may not include a time limited authorization unlock code such that all unlocks are perpetual. However such an audit mode may be turned off at any time to allow future attempts to activate copies for a specific serial number to be disallowed.

In the alternative, or in addition, the authorization authority may use a running count of the number of executions of the software to keep track of a limited use authorization. For example instead of allowing the fifteenth to twenty ninth copies of the software to run for ninety days before requiring re-authorization, the publisher could require re-authorization after a defined number of executions (e.g., one hundred) of the software. Of course, a combination of the two methods may also be used.

In the alternative, or in addition, certain features of the software may be enabled/disabled based on the copy count and/or number of executions for a given serial number. For example, the unlock key may allow the computing device to run a full version of the software with all features enabled when the copy count for the software serial number does not exceed a first upper limit. The unlock key may allow the computing device to run a version of the software with one or more features disabled when the copy count exceeds the first upper limit. In the alternative, or in addition, increasing numbers of software features may be disabled with increasing copy counts, thereby escalating the restrictions on the software with increasing copy counts for a given software serial number. It is noted that any known suitable approach to limiting the use of software may be implemented so that the full featured use of the software is avoided, including but not limited to feature disablement.

In accordance with one aspect of the embodiments described herein, there is provided a method (typically executed on the authorization authority side) for auditing software usage, comprising: (a) receiving a serial number for a software installed on a computing device and a device identifier for the device; (b) determining whether the received serial number corresponds to one of recognized serial numbers; (c) in response to determination that the received serial number corresponds to one of the recognized serial numbers, calculating a copy count for the received serial number; (d) in response to the copy count not exceeding a first upper limit of software copies, sending an unlimited unlock key to the device; and (e) in response to the copy count being greater than the first preset number but not exceeding a second upper limit, sending a first limited unlock key to the device. The method may further comprise receiving an unlock code request for the software from the device.

In one embodiment, the step of sending the first limited unlock key may comprise sending a first unlock code that allows the software to run on the device for a first time period before requiring re-authorization to continue use of the software on the device. The method may further comprise, in response to the copy count being greater than the second upper limit but not exceeding a third upper limit, sending a second limited unlock key to the device. The step of sending the second limited unlock key may comprise sending a second unlock code that allows the software to run on the device for a second time period before requiring re-authorization to continue use of the software on the device. The second time period may be shorter, and therefore more restrictive, than the first time period.

In another embodiment, the step of sending the first limited unlock key may comprise sending a first unlock code that allows the software to run on the device for a defined number of executions before requiring re-authorization to continue use of the software on the device. In yet another embodiment, the step of sending the first limited unlock key may comprise sending a first unlock code that allows the software to run on the device with at least one feature of the software disabled.

The step of sending the unlimited unlock key may comprise sending an unlock code that allows use of the software on the device without time restrictions. The step of verifying whether the received serial number corresponds to one of the recognized serial numbers may comprise: (a) accessing a database storing the recognized serial numbers; and (b) determining whether the received serial number matches one of the recognized serial numbers stored on the database.

In still another embodiment, the method may further comprise setting at least one of the first upper limit and the second upper limit based at least in part on the copy count for the received serial number.

In accordance with another aspect of the embodiments described herein, there is provided a method (typically executed on the client side) for auditing software usage, comprising: (a) sending a serial number for a software installed on a computing device and a device identifier for the device to an authorization authority, the authorization authority calculating a copy count for the serial number; (b) in response to the copy count not exceeding a first upper limit of software copies, receiving from the authorization authority an unlimited unlock key for the software; and (c) in response to the copy count being greater than the first upper limit but not exceeding a second upper limit, receiving from the authorization authority a first limited unlock key for the software. The method may further comprise sending an unlock code request for the software to the authorization authority.

In one embodiment, the step of receiving the first limited unlock key may comprise receiving a first unlock code that allows the software to run on the device for a first time period before requiring re-authorization to continue use of the software on the device. In another embodiment, the step of receiving the first limited unlock key may comprise receiving a first unlock code that allows the software to run on the device for a defined number of executions before requiring re-authorization to continue use of the software on the device. In yet another embodiment, the step of receiving the first limited unlock key may comprise receiving a first unlock code that allows the software to run on the device with at least one feature of the software disabled.

The method may further comprise, in response to the copy count being greater than the second upper limit but not exceeding a third upper limit, receiving from the authorization authority a second limited unlock key to the device. The step of receiving the second limited unlock key may comprise receiving a second unlock code that allows the software to run on the device for a second time period before requiring re-authorization to continue use of the software on the device. The second time period may be shorter, and therefore more restrictive, than the first time period.

The step of receiving the unlimited unlock key may comprise receiving an unlock code that allows use of the software on the device without time restrictions. The method preferably comprises storing one of the unlimited unlock key and the first limited unlock key in memory.

In accordance with another aspect of the embodiments described herein, there is provided a authorization authority system or server for auditing software usage. The system may comprise: a receiver module adapted to receive a serial number for a software installed on a computing device and a device identifier for the device; a transmitter module; a processor module operatively coupled to the receiver and transmitter modules; and a memory module operatively coupled to the processor module.

The memory module may comprise executable code for the processor module to: determine whether the received serial number corresponds to one of recognized serial numbers; in response to determination that the received serial number corresponds to one of the recognized serial numbers, calculate a copy count for the received serial number; in response to the copy count not exceeding a first upper limit of software copies, instruct the transmitter module to send an unlimited unlock key to the device; and in response to the copy count being greater than the first upper limit but not exceeding a second upper limit, instruct the transmitter module to send a first limited unlock key to the device. The receiver module may be adapted to receive an unlock code request for the software from the device.

In one embodiment, the first limited unlock key may allow the software to run on the device for a first time period before requiring re-authorization to continue use of the software on the device. The memory module may further comprise executable code for the processor module to, in response to the copy count being greater than the second upper limit but not exceeding a third upper limit, instruct the transmitter module to send a second limited unlock key to the device. The second limited unlock key may allow the software to run on the device for a second time period before requiring re-authorization to continue use of the software on the device. The second time period may be shorter, and therefore more restrictive, than the first time period. The unlimited unlock key may allow use of the software on the device without time restrictions.

In another embodiment, the system may further comprise a database storing the recognized serial numbers. The processor module may verify whether the received serial number corresponds to one of the recognized serial numbers by:

accessing the database; and determining whether the received serial number matches one of the recognized serial numbers stored on the database.

In yet another embodiment, the system may store an algorithm for determining whether the received serial number corresponds to a legitimate or recognized serial number. The system may be adapted to store received serial numbers determined to be legitimate, and may keep track of the number of or calculate a copy count and/or an execution count for the received serial number.

In accordance with another aspect of the embodiments described herein, there is provided a client-side system or server for auditing software usage. The system may comprise: a receiver module; a processor module operatively coupled to the receiver module; and a memory module operatively coupled to the processor module and comprising executable code for the processor module to: obtain a serial number for a software installed on a computing device; determine a device identifier for the device; and instruct the transmitter module to send the serial number and the device identifier to the authorization authority, the authorization authority calculating a copy count for the serial number.

In response to the copy count not exceeding a first upper limit of software copies, the receiver module may receive from the authorization authority a unlimited unlock key for the software. In response to the copy count being greater than the first upper limit but not exceeding a second upper limit, the receiver module may receive from the authorization authority a first limited unlock key for the software.

The system may further comprise a transmitter module operatively coupled to the processor module, wherein the memory module further comprises executable code for the processor module to instruct the transmitter module to send an unlock code request for the software to an authorization authority.

In one embodiment, the first limited unlock key may allows the software to run on the device for a first time period before requiring re-authorization to continue use of the software on the device. In response to the copy count being greater than the second upper limit but not exceeding a third upper limit, the receiver module may receive from the authorization authority a second limited unlock key for the software. The second limited unlock key may allow the software to run on the device for a second time period before requiring re-authorization to continue use of the software on the device. The second time period is shorter, and therefore more restrictive, than the first time period.

The unlimited unlock code may allow use of the software on the device without time restrictions. It is noted that, in one embodiment, the client-side system may comprise the computing device.

In accordance with another aspect of the embodiments described herein, there is provided a method for auditing software usage, comprising: (a) receiving a serial number for a software installed on a computing device and a device identifier for the device; (b) determining whether the received serial number corresponds to one of recognized serial numbers; (c) in response to determination that the received serial number corresponds to one of the recognized serial numbers, calculating a software execution count for the received serial number; (d) in response to the execution count not exceeding a first upper limit of executions, sending an unlimited unlock key to the device; and (e) in response to the execution count being greater than the first preset number but not exceeding a second upper limit, sending a first limited unlock key to the device. The method may further comprise receiving an unlock code request for the software from the device.

In one embodiment, the step of sending the first limited unlock key may comprise sending a first unlock code that allows the software to run on the device for a defined number of executions before requiring re-authorization to continue use of the software on the device. In another embodiment, the step of sending the first limited unlock key may comprise sending a first unlock code that allows the software to run on the device for a first time period before requiring re-authorization to continue use of the software on the device. In yet another embodiment, the step of sending the first limited unlock key may comprise sending a first unlock code that allows the software to run on the device with at least one feature of the software disabled.

In accordance with another aspect of the embodiments described herein, there is provided a method for auditing software usage, comprising: (a) sending a serial number for a software installed on a computing device and a device identifier for the device to an authorization authority, the authorization authority calculating an execution count for the serial number; (b) in response to the execution count not exceeding a first upper limit of software copies, receiving from the authorization authority an unlimited unlock key for the software; and (c) in response to the execution count being greater than the first upper limit but not exceeding a second upper limit, receiving from the authorization authority a first limited unlock key for the software.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

What is claimed is:

1. A method for auditing software usage, comprising:
   receiving a serial number for a software installed on a computing device and a device identifier for the device;
   determining whether the received serial number corresponds to one of recognized serial numbers;
   in response to determination that the received serial number corresponds to one of the recognized serial numbers, calculating a copy count for the received serial number;
   in response to the copy count not exceeding a first upper limit of software copies, sending an unlimited unlock key to the device; and
   in response to the copy count being greater than the first upper limit but not exceeding a second upper limit, sending a first limited unlock key to the device.

2. The method of claim 1, wherein sending the first limited unlock key comprises sending a first unlock code that allows the software to run on the device for a first time period before requiring re-authorization to continue use of the software on the device.

3. The method of claim 2, further comprising, in response to the copy count being greater than the second upper limit but not exceeding a third upper limit, sending a second limited unlock key to the device.

4. The method of claim 3, wherein sending the second limited unlock key comprises sending a second unlock code that allows the software to run on the device for a second time period before requiring re-authorization to continue use of the software on the device.

5. The method of claim 1, wherein sending the first limited unlock key comprises sending a first unlock code that allows the software to run on the device for a defined number of executions before requiring re-authorization to continue use of the software on the device.

6. The method of claim 1, wherein sending the first limited unlock key comprises sending a first unlock code that allows the software to run on the device with at least one feature of the software disabled.

7. The method of claim 1, further comprising receiving an unlock code request for the software from the device.

8. The method of claim 7, further comprising switching to a limiting mode, comprising, in response to the copy count being greater than the first upper limit, informing a user that the unlock code request has failed.

9. A method for auditing software usage, comprising:
sending a serial number for a software installed on a computing device and a device identifier for the device to an authorization authority, the authorization authority calculating a copy count for the serial number;
in response to the copy count not exceeding a first upper limit of software copies, receiving from the authorization authority an unlimited unlock key for the software; and
in response to the copy count being greater than the first upper limit but not exceeding a second upper limit, receiving from the authorization authority a first limited unlock key for the software.

10. The method of claim 9, wherein receiving the first limited unlock key comprises receiving a first unlock code that allows the software to run on the device for a first time period before requiring re-authorization to continue use of the software on the device.

11. The method of claim 10, further comprising, in response to the copy count being greater than the second upper limit but not exceeding a third upper limit, receiving from the authorization authority a second limited unlock key to the device.

12. The method of claim 11, wherein receiving the second limited unlock key comprises receiving a second unlock code that allows the software to run on the device for a second time period before requiring re-authorization to continue use of the software on the device.

13. The method of claim 9, wherein receiving the first limited unlock key comprises receiving a first unlock code that allows the software to run on the device for a defined number of executions before requiring re-authorization to continue use of the software on the device.

14. The method of claim 9, wherein receiving the first limited unlock key comprises receiving a first unlock code that allows the software to run on the device with at least one feature of the software disabled.

15. The method of claim 9, further comprising sending an unlock code request for the software to the authorization authority.

16. The method of claim 15, further comprising switching to a limiting mode, comprising, in response to the copy count being greater than the first upper limit, receiving a message that the unlock code request has failed.

17. A system for auditing software usage, comprising:
a receiver module adapted to receive a serial number for a software installed on a computing device and a device identifier for the device;
a transmitter module;
a processor module operatively coupled to the receiver and transmitter modules; and
a memory module operatively coupled to the processor module and comprising executable code for the processor module to:
determine whether the received serial number corresponds to one of recognized serial numbers;
in response to determination that the received serial number corresponds to one of the recognized serial numbers, calculate a copy count for the received serial number;
in response to the copy count not exceeding a first upper limit of software copies, instruct the transmitter module to send an unlimited unlock key to the device; and
in response to the copy count being greater than the first upper limit but not exceeding a second upper limit, instruct the transmitter module to send a first limited unlock key to the device.

18. The system of claim 15, wherein the first limited unlock key allows the software to run on the device for a first time period before requiring re-authorization to continue use of the software on the device.

19. The system of claim 18, wherein the memory module further comprises executable code for the processor module to, in response to the copy count being greater than the second upper limit but not exceeding a third upper limit, instruct the transmitter module to send a second limited unlock key to the device.

20. The system of claim 19, wherein the second limited unlock key allows the software to run on the device for a second time period before requiring re-authorization to continue use of the software on the device.

21. The system of claim 20, wherein the second time period is shorter than the first time period.

22. A client-side system for auditing software usage, comprising:
a receiver module;
a processor module operatively coupled to the receiver module; and
a memory module operatively coupled to the processor module and comprising executable code for the processor module to:
obtain a serial number for a software installed on a computing device;
determine a device identifier for the device;
instruct the transmitter module to send the serial number and the device identifier to the authorization authority, the authorization authority calculating a copy count for the serial number;
wherein, in response to the copy count not exceeding a first upper limit of software copies, the receiver module receives from the authorization authority a unlimited unlock key for the software; and
wherein, in response to the copy count being greater than the first upper limit but not exceeding a second upper limit, the receiver module receives from the authorization authority a first limited unlock key for the software.

23. The system of claim 22, further comprising a transmitter module operatively coupled to the processor module, wherein the memory module further comprises executable code for the processor module to instruct the transmitter module to send an unlock code request for the software to an authorization authority.

24. The system of claim 22, wherein the first limited unlock key allows the software to run on the device for a first time period before requiring re-authorization to continue use of the software on the device.

25. The system of claim 24, wherein, in response to the copy count being greater than the second upper limit but not exceeding a third upper limit, the receiver module receives from the authorization authority a second limited unlock key for the software.

26. The system of claim 25, wherein the second limited unlock key allows the software to run on the device for a second time period before requiring re-authorization to continue use of the software on the device.

27. The system of claim 26, wherein the second time period is shorter than the first time period.

28. A method for auditing software usage, comprising:
receiving a serial number for a software installed on a computing device and a device identifier for the device;
determining whether the received serial number corresponds to one of recognized serial numbers;
in response to determination that the received serial number corresponds to one of the recognized serial numbers, calculating a software execution count for the received serial number;
in response to the execution count not exceeding a first upper limit of executions, sending an unlimited unlock key to the device; and
in response to the execution count being greater than the first upper limit but not exceeding a second upper limit, sending a first limited unlock key to the device.

29. The method of claim 28, wherein sending the first limited unlock key comprises sending a first unlock code that allows the software to run on the device for a defined number of executions before requiring re-authorization to continue use of the software on the device.

30. A method for auditing software usage, comprising:
receiving a serial number for a software installed on a computing device and a device identifier for the device;
determining whether the received serial number corresponds to one of recognized serial numbers;
determining whether the device identifier corresponds to a recognized device identifier, and if the device identifier is not recognized, compiling a new unique device identifier from a hardware configuration of the computing device;
in response to recognizing the received serial number, calculating a copy count for the received serial number;
in response to the copy count not exceeding a first upper limit of software copies, sending an unlimited unlock key to the device; and
in response to the copy count being greater than the first upper limit, sending a first limited unlock key to the device.

* * * * *